United States Patent [19]

Palfreeman

[11] 3,754,192

[45] Aug. 21, 1973

[54] ELECTROMECHANICAL FREQUENCY SELECTIVE DEVICES

[75] Inventor: John Siegfried Palfreeman, Betchworth, Surrey, England

[73] Assignee: U.S. Philips Corporation, New York, N.Y.

[22] Filed: Jan. 5, 1972

[21] Appl. No.: 215,499

[30] Foreign Application Priority Data

Jan. 5, 1971 Great Britain ........................ 439/71

[52] U.S. Cl. ........................ 330/5.5, 330/1, 330/147, 333/30, 333/71

[51] Int. Cl. ................................................ H03f 3/04

[58] Field of Search ................. 330/5.5, 12; 333/30, 333/71

[56] References Cited

UNITED STATES PATENTS 3,648,081 3/1972 Lean et al. ........................... 330/5.5

*Primary Examiner*—Roy Lake
*Assistant Examiner*—Darwin R. Hostetter
*Attorney*—Frank R. Trifari

[57] ABSTRACT

Electromechanical frequency selective filters are disclosed wherein a wafer of piezoelectric material converts an electric input signal into a surface wave by means of an input transducer comprising electrodes of conductive material on the surface of the wafer. The surface wave is converted into an electric output signal by means of an output transducer comprising two comb-shaped interdigital electrodes made of conductive material and arranged on the same surface of the wafer of piezoelectric material. Either or both of the transducers are split into a plurality of sub-electrodes which are electrically insulated from one another. Signals produced at output transducer sub-electrodes are separately applied to associated unidirectional amplifiers whose outputs are combined to obtain a desired overall output signal.

4 Claims, 4 Drawing Figures

ELECTROMECHANICAL FREQUENCY SELECTIVE DEVICES

The invention relates to an electromechanical filter employing elastic surface waves and comprising a body of a piezo-electric material provided with an input transducer for converting an electric input signal into a surface wave and with an output transducer for converting this surface wave into an electric output signal, the output transducer comprising two comb-shaped interdigital electrodes made of a conductive material and arranged on the same surface of the body of piezoelectric material.

The overall filter characteristic of such a filter is determined by the product of the responses of the two transducers. The response of the output transducer comprising comb-shaped interdigital electrodes depends upon several parameters, such as the length and width of the fingers of the comb-shaped electrodes, the spacing between two adjacent fingers and the variation of the said parameters in a direction at right angles to the fingers of the electrodes, i.e. in a direction corresponding to the propagation direction of the surface wave.

According as a filter characteristic of smaller bandwidth or increasingly complicated shape is desired, the number of fingers of the comb-shaped electrodes increases. However, it has been found in practice that undesirable interactions may occur between the various parts of such a transducer comprising comb-shaped electrodes, which interactions may appreciably disturb the response of the transducer. It has further been found that the occurrence of these undesirable interactions depends upon the value of the coupling factor of the piezoelectric material used for the body and also on the number of fingers of the comb-shaped electrodes. As a result, these interactions are particularly inconvenient when they are most undesirable, i.e., when a complicated variation of the filter characteristic is desired and hence the number of fingers is large. For example, this interaction is highly inconvenient when such a filter is used in the intermediate-frequency stage of a television receiver, in which case the filter characteristic has to satisfy exacting requirements.

It is an object of the invention to reduce such undesirable interactions, thereby providing transducers capable of satisfying very exacting requirements with respect to their responses.

The invention is characterized in that one of the electrodes of the output transducer is split into a plurality of sub-electrodes which are electrically insulated from one another, and in that the signals produced at the said sub-electrodes are separately applied each to an associated isolating amplifier, generally referred to as a unidirectional amplifier, the output signals of the amplifiers being combined to obtain the desired overall output signal from the output transducer at an output terminal.

According to the invention one of the electrodes is split into a plurality of electrically insulated sub-electrodes. Logically such a sub-electrode has a smaller number of fingers than has the entire electrode and hence it will be less subject to the said interactions, whilst naturally the degree of reduction depends upon the number of sub-electrodes and upon the division of the fingers of the initial electrode between these sub-electrodes. To obtain a response which corresponds to that of the entire electrode the signals produced at the various sub-electrodes must be added to one another. In this process care must be taken to prevent the signal at any of the sub-electrodes from acting upon the other sub-electrodes, since this would nullify the entire effect of the sub-electrodes and the said interaction would still occur. According to the invention the signals are added to one another via unidirectional amplifiers, i.e., the signal produced at each of the sub-electrodes is supplied to the summation point via a unidirectional amplifier. The term unidirectional amplifier is used in this specification to denote an amplifier in which the output to input transfer factor is very small, and for this purpose a wide variety of known transistor amplifiers may be used.

When the gain factors of all the unidirectional amplifiers are equal, the overall response will be equal to the response of the entire electrode with the essential advantage that the said interactions are appreciably reduced. By using unidirectional amplifiers having gain factors greater than unity the amplifiers may also serve to compensate for the attenuation of the signal which occurs in such electromechanical filters.

A further advantage of the arrangement according to the invention is that highly complicated responses are obtainable, for the sub-electrodes may have widely different responses and by using unidirectional amplifiers having different gain factors these responses may be combined in a variety of manners to provide the overall response of the transducer.

The input transducer may have various known configurations. Obviously the input transducer also may comprise two comb-shaped interdigital electrodes. If the input transducer is made so as to have a wide bandwidth, i.e., when the filter characteristic is effectively determined by the output transducer alone, the electrodes of this input transducer will comprise only a few fingers, so that the likelihood of the occurrence of undesired interactions is very small. If, however, the input transducer is to perform a real function in establishing the filter characteristic, the number of fingers will be increased and consequently the said interactions may again occur. In a further embodiment of the filter according to the invention this is prevented in that one of the electrodes of the input transducer also is split into a plurality of electrically insulated sub-electrodes and the input signal is applied to each of these sub-electrodes via an associated unidirectional amplifier.

Finally in a further embodiment of the filter according to the invention several filter characteristics may economically be obtained simultaneously. This is highly advantageous, for example, when the filter is used as an intermediate-frequency filter in a colour television receiver, where a filter characteristic having a bandwidth of about 4 MHz for the luminance signal and at the same time a filter characteristic having a bandwidth of about 5 MHz for the chrominance signal together with the audio signal are required. Normally either two separate filters or a single filter having two separate output transducers would have to be used for this purpose. In an application of a further embodiment of a filter according to the invention a single output transducer is sufficient, which transducer is of the type which provides an overall response corresponding to the desired filter characteristic having the smaller bandwidth, in the above-mentioned intermediate-frequency television filter a bandwidth of about 4 MHz. By a suitable choice of the sub-electrodes from which the entire electrode is built it can be ensured that by combining the responses of just a plurality of these sub-electrodes a filter characteristic having the larger bandwidth, i.e., a bandwidth of 5 MHz in the above-mentioned intermediate-frequency television filter, is obtained. In this manner an additional transducer may be disensed with. Obviously more than two filter characteristics are obtainable by using more than two combinations of sub-electrodes.

Embodiments of the invention will now be described, by way of example, with reference to the accompanying diagrammatic drawings, in which.

Figure 1:
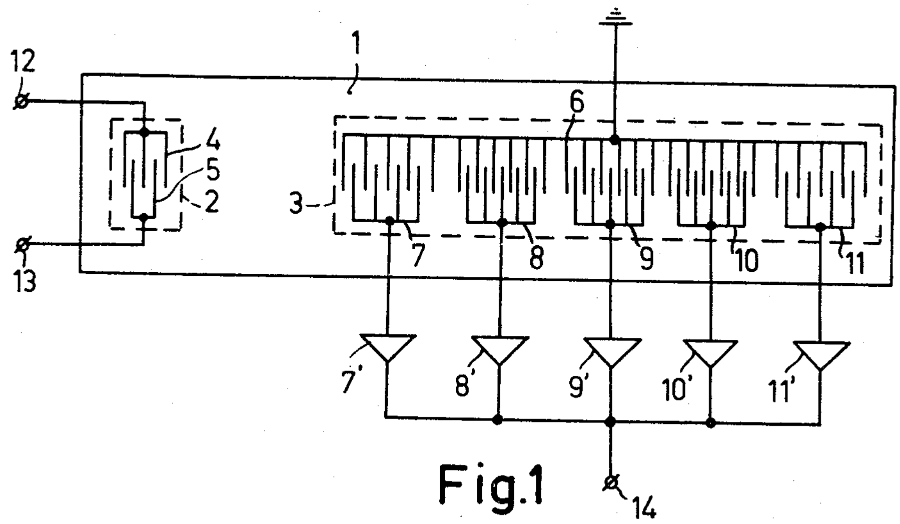
FIG. 1 illustrates schematically one embodiment of the invention.

FIG. 1 shows in top plan view a wafer 1 made of a piezoelectric material. On this wafer 1 is arranged an input transducer 2 comprising two comb-shaped interdigital electrodes 4 and 5 made of a conductive material, for example, by vapour-deposition of the conductive material on the wafer, after which the desired electrode configuration has been obtained by means of a photolithographic process. An input signal applied to two terminals 12 and 13 each connected to one of the electrodes 5 is converted by this input transducer 2 into an elastic surface wave which propagates along the surface of the wafer 1 in a direction at right angles to the fingers of the electrodes 4 and 5. This surface wave is reconverted into an electric signal by means of an output transducer 3. This output transducer 3 has a comb-shaped interdigital electrode 6 which is connected to earth. According to the invention the second electrode of this output transistor, however, does not take the form of an integral unit but is split into a plurality of electrically isolated sub-electrodes 7, 8, 9, 10 and 11. Each of these sub-electrodes again is comb-shaped, the fingers being interdigitated with the fingers of the electrode 6. Obviously, the electrode 6 also may be split into a plurality of sub-electrodes which each are connected to earth.

Each of the sub-electrodes 7, 8, 9, 10 and 11 is connected to the input of a unidirectional amplifier 7', 8', 9', 10' and 11' respectively, the output signals of the amplifiers being added to one another and being available at an output terminal 14.

Each of the sub-electrodes has only a limited number of fingers, so that the interaction between different fingers of such a sub-electrode is very small. The interaction between the various sub-electrodes is negligible, because there is no direct electric connection between these sub-electrodes and any interaction which may occur can only be due to a reaction of the output signals of the unidirectional amplifiers to the inputs thereof. However, in a suitably constructed amplifier this reaction is very small, whilst it should be noted that even the simplest transistor amplifiers can be satisfactory in this respect.

When all the unidirectional amplifiers have unity gain, the response of the output transducer 3 is equal to the response of a transducer comprising an electrode 6 and a second electrode made up of the sub-electrodes 7, 8, 9, 10 and 11, apart from the disturbing effect due to the interaction which occurs in the latter electrode. Thus the step according to the invention provides an output transducer by means of which a response having, for example, a very narrow bandwidth is obtainable, without this response being disturbed by undesirable interactions between the various parts of the transducer. Hence the total number of the fingers of the output transducer may safely be increased without the interaction exerting an excessively disturbing influence of the response, because the number of sub-electrodes may safely be increased.

Although in the embodiment described the electrodes have fingers of equal length, it will be clear that both the length and the width of the fingers and the spacings between adjacent fingers may be varied to obtain a desired response. The overall response may further be varied by the choice of the gain factors of the various unidirectional amplifiers. If the unidirectional amplifiers are given unequal gain factors, the signals produced at the sub-electrodes may be added to one another with the use of different weighting factors. Thus an output signal is obtainable the frequency dependence of which is determined by the response of the various sub-electrodes and also by the various weighting factors with which these responses take effect in the overall response, so that in this manner highly complicated filter characteristics are obtainable.

Figures 2, 3, 4:
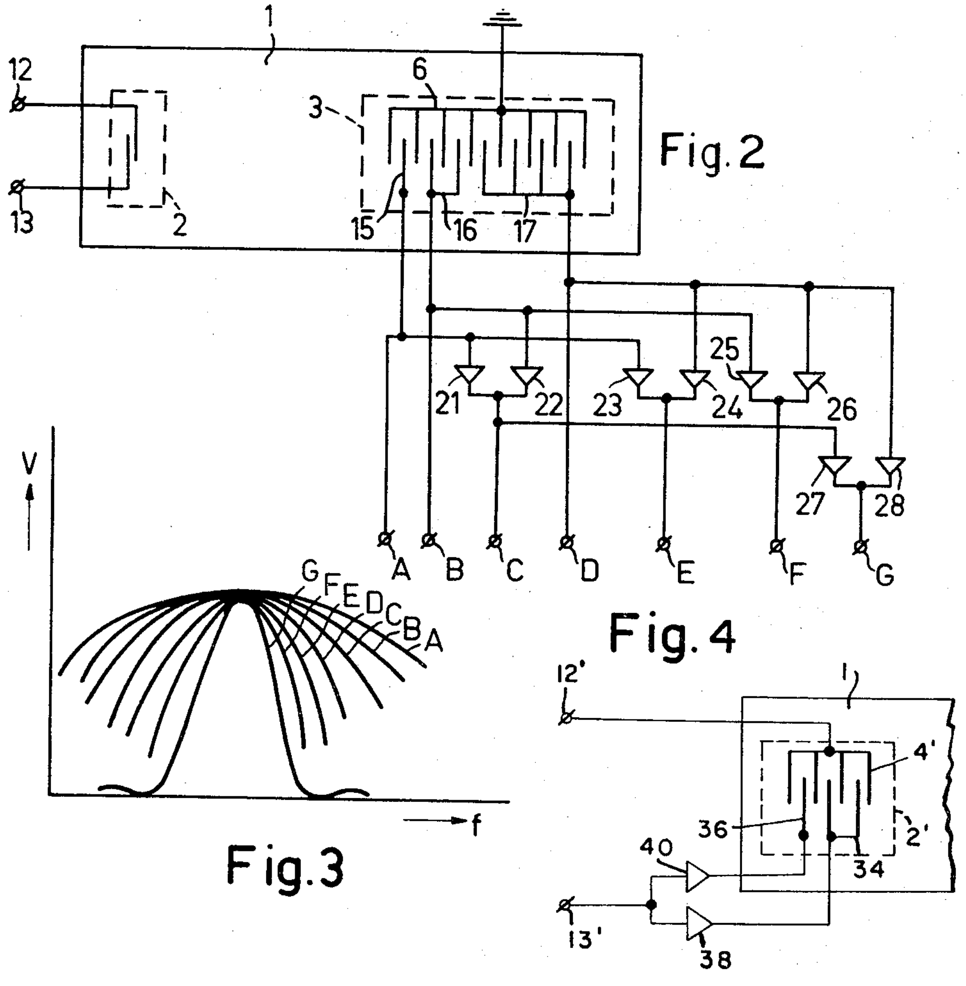
FIG. 2 illustrates schematically another embodiment of the invention.
FIG. 3 is a family of curves illustrating the operation of the embodiment shown in FIG. 2
FIG. 4 illustrates schematically still another embodiment of the invention, partially broken away, showing an alternative input transducer for the input transducers illustrated in the embodiments of FIGS. 1 and 2.

FIG. 2 shows a second embodiment of a filter according to the invention, corresponding elements being designated by the same reference numerals as in FIG. 1. The filter again comprises a wafer of a piezoelectric material on one surface of which is again arranged an input transducer to which an input signal is applied via terminals 12 and 13. Again, the filter comprises an output transducer 3 having a first electrode 6 connected, for example, to earth potential.

The second electrode of this output transducer 3 again is split into a plurality of sub-electrodes 15, 16 and 17, and by way of example the sub-electrode 15 has one finger, the sub-electrode 16 has two fingers and the sub-electrode 17 has four fingers. By means of unidirectional amplifiers the signals produced at the various sub-electrodes are combined in all possible manners, resulting in seven different output signals at terminals A to G, which signals each have a different frequency dependence. For example, the output terminal A is directly connected to the sub-electrode 15. Since this sub-electrode 15 has only one finger, the filter characteristic for the output signal at the terminal A will have a large bandwidth, as is shown schematically in FIG. 3 in which the amplitudes of the output signals at the various output terminals A to G are shown as functions of frequency.

A second output terminal B is directly connected to the sub-electrode 16. Since this sub-electrode has two fingers, the filter characteristic at the terminal B will have a smaller bandwidth than that at the terminal A (see FIG. 3). A third output terminal C is connected to the outputs of two unidirectional amplifiers 21 and 22, the input of the amplifier 21 being connected to the sub-electrode 15 and the input of the amplifier 22 being connected to the sub-electrode 16. Thus, the output signal at the terminal C is the sum of the signals produced at the sub-electrodes 15 and 16. A fourth output terminal D is directly connected to the sub-electrode 17. A fifth output terminal E receives, via unidirectional amplifiers 23 and 24, the sum of the signals produced at the sub-electrodes 15 and 17. A sixth output terminal F receives, via unidirectional amplifiers 25 and 26, the sum of the signals produced at the sub-electrodes 16 and 17. Finally a seventh output terminal G receives the sum of the signals produced at the sub-electrodes 15, 16 and 17, since it is connected to the outputs of the unidirectional amplifiers 28 the input of which is connected to the sub-electrode 17 and to the output of a unidirectional amplifier 27 the input of which is connected to the terminal C.

Thus a plurality of output signals having different frequency dependences relative to the input signal applied to the input transducer may simultaneously be derived. In the embodiment shown seven output signals may be derived, the response becoming progressively narrower from A to G owing to the increasing number of fingers of the effectively operative electrode.

Thus according to requirements there may simultaneously be derived two or more output signals having different filter characteristics, which feature, as has been mentioned before, may be useful in an intermediate-frequency television filter.

Although in the two embodiments shown the input transducer is a wide-band transducer, i.e., a transducer having a small number of fingers, it may frequently be required for this input transducer also to have a narrow bandwidth. Because in this case the number of fingers of the electrodes will be increased, in such an input transducer also interaction effects will play a role. This may be avoided in the same manner as used in the output transducer in that at least one of the electrodes is split into a plurality of sub-electrodes to which the input signal is applied through unidirectional amplifiers.

An input transducer with one of the electrodes split into a plurality of sub-electrodes is shown in FIG. 4. The input transducer 4' corresponds to the input transducer 4 of FIG. 1 with corresponding elements bearing prime designations. In addition, electrode 5 of FIG. 1 is replaced by sub-electrodes 34 and 36 with input terminal 13' connected to sub-electrodes 34 and 36 by unidirectional amplifiers 38 and 40 respectively.

It will further be appreciated that instead of a plurality of unidirectional amplifiers a single such amplifier having several inputs may be used, in which case obviously the reaction of the output signal of the amplifier to its inputs must again be very small and in addition no coupling is allowed between the various inputs.

As a final alternative both electrodes of a transducer may be split into a plurality of sub-electrodes and be connected to sum terminals via unidirectional amplifiers.

What is claimed is an:

1. Electromechanical filter employing elastic surface waves and comprising a wafer of a piezoelectric material provided with an input transducer for converting an electric input signal into a surface wave and with an output transducer for converting this surface wave into an electric output signal, the output transducer comprising two comb-shaped interdigital electrodes made of a conductive material and arranged on the same surface of the wafer of piezoelectric material, characterized in that one of the electrodes of the output transducer is split into a plurality of sub-electrodes, which are electrically insulated from one another, and in that the signals produced at these sub-electrodes are separately applied each to an associated unidirectional amplifier, the output signals of the unidirectional amplifiers being combined to obtain the desired overall output signal from the output transducer at an output terminal.

2. Electromechanical filter as claimed in claim 1, characterized in that the output transducer has several output terminals from which, by making different combinations of the output signals of the separate unidirectional amplifiers, different combinations of the signals produced at the various sub-electrodes may be derived.

3. Electromechanical filter as claimed in claim 1, in which the input transducer also comprises two comb-shaped interdigital electrodes made of a conductive material, characterized in that one of the electrodes of the input transducer is split into a plurality of mutually electrically insulated sub-electrodes, the input signal being applied to each of these sub-electrodes through an associated unidirectional amplifier.

4. Electromechanical filter as claimed in claim 2, in which the input transducer also comprises two comb-shaped interdigital electrodes made of a conductive material, characterized in that one of the electrodes of the input transducer is split into a plurality of mutually electrically insulated sub-electrodes, the input signal being applied to each of these sub-electrodes through an associated unidirectional amplifier.

* * * * *